M. H. MERCHANT.
TIRE CHAIN TIGHTENER.
APPLICATION FILED AUG. 7, 1917.
1,404,213.
Patented Jan. 24, 1922.
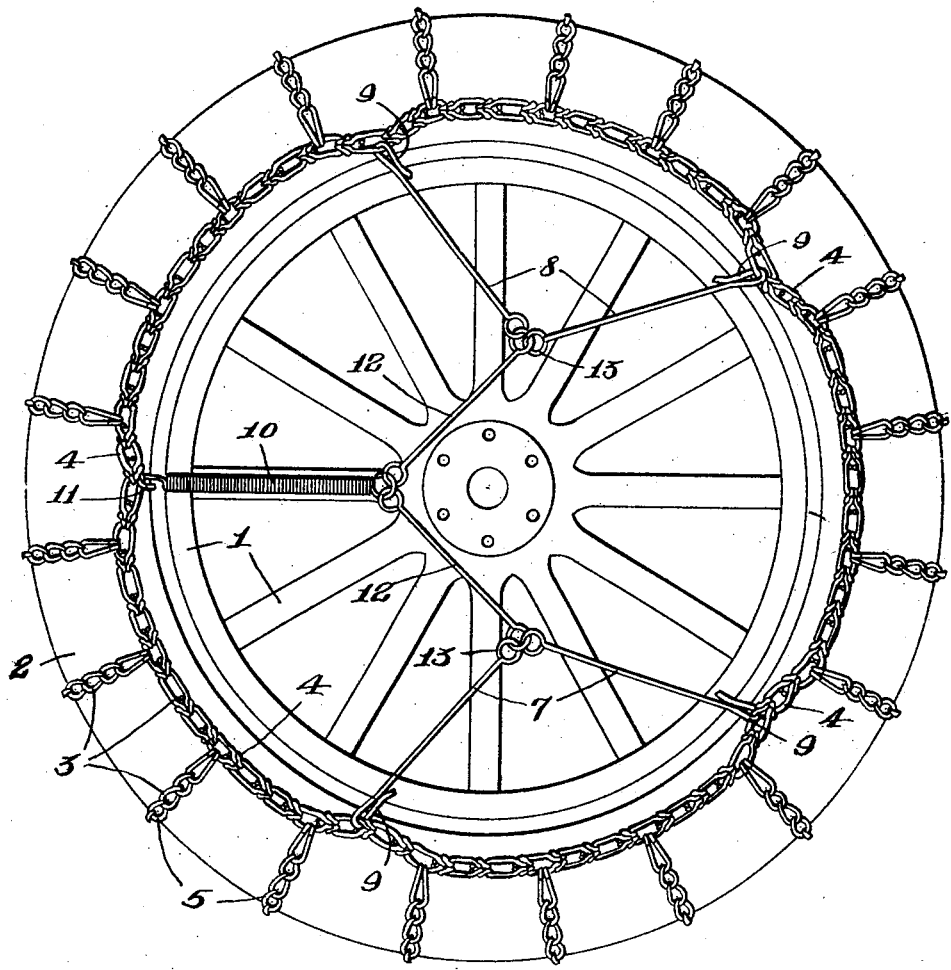
INVENTOR
Melvin H. Merchant.
BY
Parsons & Badell.
ATTORNEYS

UNITED STATES PATENT OFFICE.

MELVIN H. MERCHANT, OF SYRACUSE, NEW YORK, ASSIGNOR TO CHARLES L. JORDAN, OF SYRACUSE, NEW YORK.

TIRE-CHAIN TIGHTENER.

1,404,213.   Specification of Letters Patent.   Patented Jan. 24, 1922.

Application filed August 7, 1917. Serial No. 184,890.

*To all whom it may concern:*

Be it known that I, MELVIN H. MERCHANT, a citizen of the United States, and a resident of Syracuse, in the county of Onondaga and State of New York, have invented a certain new and useful Tire-Chain Tightener, of which the following is a specification.

This invention has for its object a tire chain tightener which is particularly simple and economical in construction, and highly efficient and durable in use; and which is readily attachable to the tire. The invention consists in the novel features and in the combinations and constructions hereinafter set forth and claimed.

In describing this invention, reference is had to the accompanying drawing which is a side elevation of an automobile wheel, the tire chain of which is provided with my invention.

My tightener is particularly adapted for the type of tire chains which have side members or chains to which the cross chains are attached, and the tightener is connected to the side chains at intervals.

This tire chain tightener comprises generally, means for engaging the tire chain at intervals, and a single spring tending to contract the tightener.

1 designates a wheel having a tire 2 thereon.

3 is the chain which includes the side members 4 and the cross members 5.

Usually the spring is a tension spring connected at one end to the side members 4 and at its other end to said means.

Preferably, the means for engaging the side chains at intervals are pairs of members or links.

7 designates one pair of members; 8, another pair, each member 7 or 8 being preferably a rigid link of wire having a hook 9 at its outer end for engaging links of the side chains 4.

10 designates the tension spring which is provided with means as a hook 11 at one end for engaging the chain 4 between the points at which two of the links 7 and 8 engage said chain 4, the spring being connected at its other end to corresponding ends of the additional links 12, which are connected at their other ends respectively to the pairs of links 7 and 8.

The links 7 and 8 are provided at their inner ends with eyes 13 and also the spring 10 is provided at its inner end with an eye or hook; and the additional links 12 are provided with eyes linked into the eyes 13 of the links 7 and 8 and into the hook at the inner end of the spring 10.

In operation, the hooks at the outer ends of the links 7 and 8 and the hook 11 at the outer end of the spring 10 are engaged with a side chain 4 at points approximately equal distance apart and the spring is of such length that it is tensioned or extended when engaged with the chain 4 so that it tends to draw inwardly the links 7 and 8, and also contract itself in a radial direction, and hence tighten the chain 4.

What I claim is:

1. A tire chain tightener comprising a plurality of pairs of members for engaging the chain at intervals, and resilient means common to all of said pairs of members and acting to draw them inwardly toward each other.

2. A tire chain tightener comprising a plurality of pairs of rigid links formed to engage the chain at intervals, and resilient means connected to all of said pairs of links and acting to draw them inwardly toward each other.

3. A tire chain tightener comprising pairs of members for engaging the chain at intervals, and a single spring connected to all the pairs and acting to draw the pairs of members inwardly toward each other, substantially as and for the purpose set forth.

4. A tire chain tightener comprising two pairs of links arranged to engage the chain at intervals, and a single spring connected to both pairs of links to pull both pairs of links inwardly, substantially as and for the purpose described.

5. A tire chain tightener comprising two pairs of members arranged to engage the chain at intervals, a spring having means associated therewith at one end for attachment to the chain, and means for connecting the other end of the spring to each pair of members to pull them inwardly, substantially as and for the purpose specified.

6. A tire chain tightener comprising two pairs of rigid links, a tension spring having means at one end for connection to the tire chain, and means connecting the other end of the spring to the inner ends of the pairs of links, substantially as and for the purpose set forth.

7. A tire chain tightener comprising two pairs of links, additional links each of which is connected to the inner ends of the links of one pair, and a tension spring provided with a hook at one end thereof for engaging the tire chain and being connected at its other end to the inner ends of the additional links.

8. A holder and equalizer for anti-skid chains for automobile tires, comprising in combination a spring, means carried at one end thereof for securing it to the tire chain; a plurality of draw bars attached to the opposite end of the spring; and a plurality of draw rods pivotally connected to the outer end of each bar, said rods being provided with means for attaching the same to the tire chain.

9. A tire chain tightener comprising a plurality of pairs of members for engaging the chain at intervals, and resilient means for drawing said pairs of members inwardly, the said means being connected to the inner ends of the several pairs of members and formed for attachment to the chain at some point between adjacent pairs.

In testimony whereof, I have hereunto signed my name, at Syracuse, in the county of Onondaga, and State of New York, this 12th day of March, 1917.

MELVIN H. MERCHANT.